US007668808B2

(12) United States Patent
Kapur et al.

(10) Patent No.: US 7,668,808 B2
(45) Date of Patent: Feb. 23, 2010

(54) SYSTEM FOR MODIFYING QUERIES BEFORE PRESENTATION TO A SPONSORED SEARCH GENERATOR OR OTHER MATCHING SYSTEM WHERE MODIFICATIONS IMPROVE COVERAGE WITHOUT A CORRESPONDING REDUCTION IN RELEVANCE

(75) Inventors: Shyam Kapur, Sunnyvale, CA (US); Nitin Sharma, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 400 days.

(21) Appl. No.: 11/077,968

(22) Filed: Mar. 10, 2005

(65) Prior Publication Data
US 2006/0206474 A1 Sep. 14, 2006

(51) Int. Cl.
*G06F 17/30* (2006.01)
(52) U.S. Cl. .................. 707/3; 707/5; 707/4; 707/6
(58) Field of Classification Search .............. 707/3, 707/4, 5
See application file for complete search history.

(56) References Cited

U.S. PATENT DOCUMENTS

| 5,201,048 | A | * | 4/1993 | Coulter et al. | 707/3 |
| 5,864,846 | A | * | 1/1999 | Voorhees et al. | 707/5 |
| 6,282,537 | B1 | * | 8/2001 | Madnick et al. | 707/4 |
| 6,671,681 | B1 | * | 12/2003 | Emens et al. | 707/5 |
| 6,745,178 | B1 | * | 6/2004 | Emens et al. | 707/3 |
| 6,816,857 | B1 | | 11/2004 | Weissman | |
| 7,133,866 | B2 | * | 11/2006 | Rishel et al. | 707/3 |
| 7,428,529 | B2 | * | 9/2008 | Zeng et al. | 707/3 |
| 7,444,324 | B2 | * | 10/2008 | Ortega et al. | 707/3 |
| 2002/0169760 | A1 | * | 11/2002 | Cheung et al. | 707/3 |
| 2005/0033641 | A1 | | 2/2005 | Jha | |
| 2005/0232131 | A1 | * | 10/2005 | Bulleit et al. | 370/200 |

FOREIGN PATENT DOCUMENTS

WO WO 2005/020094 A 3/2005

OTHER PUBLICATIONS

Nambiar et al., "Answering Inprecise Data Queries: A Novel Approach", WIDM '03, Nov. 7-8, 2003, ACM, p. 126-133.*
Notification of Transmittal of the International Search Report and the Written Opinion of the International Searching Authority, or the Declaration received in corresponding International application No. PCT/US2006/008563.
Notification of Transmittal of the International Search Report and the Written Opinion of the International Searching Authority, or the Declaration received in corresponding International application No. PCT/US2006/008563, Aug. 2, 2006.

* cited by examiner

*Primary Examiner*—Cam Y T Truong
(74) *Attorney, Agent, or Firm*—Hickman Palermo Truong & Becker LLP

(57) ABSTRACT

Techniques are provided for modifying queries to increase the number of sponsored links that are returned in response to the queries. A query modification system uses a predefined set of rules that are designated to modify a query to increase the chance that the modified query will match more sponsored links. The modified query is then matched against a listing of search query strings that have been pre-selected by sponsors. Each pre-selected search query strings corresponds to one or more sponsored web links. If the modified query matches one of the pre-selected search query strings, the corresponding sponsored web links are returned and displayed to the user.

25 Claims, 8 Drawing Sheets

SYSTEM FOR MODIFYING QUERIES BEFORE PRESENTATION TO A SPONSORED SEARCH GENERATOR OR OTHER MATCHING SYSTEM WHERE MODIFICATIONS IMPROVE COVERAGE WITHOUT A CORRESPONDING REDUCTION IN RELEVANCE

BACKGROUND OF THE INVENTION

The present invention relates to search systems generally, wherein a query is processed to return search results, and more particularly to techniques for modifying queries before presentation to a sponsored search generator or other matching system where modifications improve coverage without a corresponding reduction in relevance.

With the advent of the Internet and the multitude of web pages and media content available to a user over the World Wide Web (web), there has become a need to provide users with streamlined approaches to filter and obtain desired information from the web. Search systems and processes have been developed to meet the needs of users to obtain desired information. Examples of such technologies can be accessed through Yahoo!'s website, Google's website and other sites.

Typically, a search process involves a user inputting a query to the search system and the search system returning one or more search results ("hits") that are deemed responsive to the query. Many search providers also display sponsored links along with the search results, where the main search results result from searching a corpus such as a collection of Web pages referenced by an index and where the sponsored links are found in a database of sponsored links set up to supply relevant links to searchers on behalf of sponsors.

Ideally, the sponsored links that are provided are relevant to the query. For example, if a searcher (which can be a person, a person using a computer, or a computer) submits a search query in the form of a search query string such as "European vacation", the search engine might find pages from the Web that are deemed to relate to vacationing in Europe. The sponsored search links might be found from the sponsored link database according to purchased keywords.

Thus, a travel agent sponsor might pay to have a link they devise presented to queriers that use "European vacation" in their search query. Often, sponsored advertising links are sold using a "pay per click" model, wherein the search system might present a sponsored link, but the sponsor only pays the search system operator when and if the querier clicks on the sponsored link.

With a pay per click model, the search system operator would like to ensure that the sponsored links are relevant to the search. If, for example, sponsored links for auto repair are displayed with search results for vacations, it is not likely that the reader will be interested, and such links would have a very low click-through rate and the search system operator would not see much revenue. On the other end, if the search system is too strict about what it shows, insufficient coverage might result.

A sponsor typically identifies in advance one or more search query strings that should trigger the display of the sponsor's presentation. Each sponsor's presentation might be indexed against one or more of these pre-selected search query strings. Each time a search query is entered, the search system attempts to match the search query with as many of the search query strings that have been pre-selected by the sponsors as possible. When a search query submitted by a user is relevant to one of the pre-selected search query strings, a sponsor presentation could be displayed along with the other search results.

As sponsors typically indicate the keywords that are needed in a search query and expect that their sponsored presentation would not be shown at random, there are some search queries that would have no matching presentations. For example, the search query "John Q. Public's Daily Breakfast Menu" might not attract any interested sponsors, so users submitting that as a search would not see any sponsored links. Ideally, the "coverage" of search queries would be such that a large proportion of the searches performed would be covered by at least one relevant sponsored presentation. Otherwise, where search queries are not covered by any sponsored presentations, the search system operator would not see any sponsored presentation revenue for those search queries. Thus, there is a tension between casting too wide a net and having possibly irrelevant sponsored links, which would over time cause users to ignore them, and casting so narrowly that insufficient coverage results.

It would therefore be desirable to provide techniques for increasing the coverage of sponsored presentations that are returned in response to search queries while maintaining relevance or lowering instances where sponsored presentations might be deemed to be less relevant.

BRIEF SUMMARY OF THE INVENTION

The present invention provides techniques for modifying queries before presentation to a sponsored search generator or other matching system where modifications improve coverage without a corresponding reduction in relevance. A query modification system might be used to process a user's query to form a modified query that is in turn submitted to a sponsored search system to return sponsored searches with improved coverage while maintaining relevance.

In variations, the techniques can be used where the modified queries are submitted to other than a sponsored search system. Thus, the modified queries might be used to improve matchmaking such as finding a potential customer for a sponsor or finding a potential provider of suitable products and/or services for a potential customer.

The modified query can then be used to obtain sponsored presentations by matching against a listing of search query strings that have been pre-selected by sponsors or other methods. Each pre-selected search query strings might correspond to one or more sponsored web links. If the modified query matches one of the pre-selected search query strings, corresponding sponsored web links are returned and displayed to the user.

The input to the sponsored search system can be the modified query alone or the modified query and the original query. According to one embodiment of the present invention, a modified query might be generated by leaving off words, substituting phrases, differentially weighting "units" of a search, and/or using associations between units. The weighting of units might be done based on how frequently units appeared in previous search queries, the length of the units and associations between units. In some cases, weighting of units is leveraged to decide which unit to drop from the search query string to form the modified query string.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 4 comprises flowcharts illustrating more specific examples of methodologies for modifying search queries.

FIG. 5 comprises flowcharts for a process of evaluating a query to determine matches for matching against bidded terms.

FIG. 6 comprises flowcharts for a process of evaluating a query to determine matches for matching against bidded terms using a plurality of units for checking against.

DETAILED DESCRIPTION OF THE INVENTION

Figure 1:
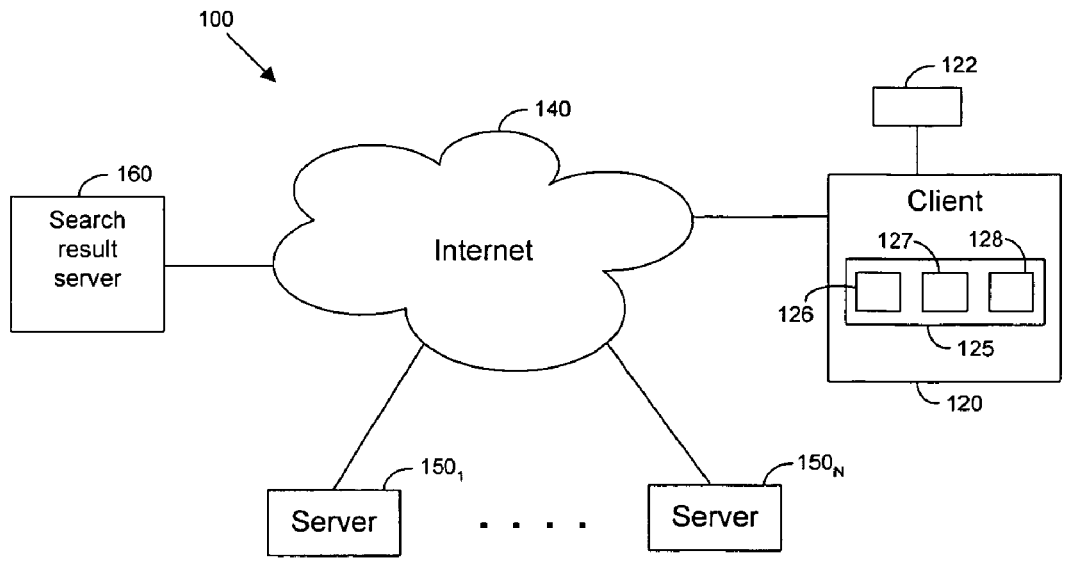
FIG. 1 is a diagram of an Internet communications system that can implement embodiments of the present invention.

FIG. 1 illustrates a general overview of an information retrieval and communication network 100 including a client system 120 according to an embodiment of the present invention. In computer network 100, client system 120 can communicate through the Internet 140, or other communication network, e.g., over any LAN or WAN connection, with a plurality of server systems $150_1$ to $150_N$. For example, client system 120 can communicate with search result server 160. As described herein, client system 120 is configured according to the present invention to communicate with any of server systems $150_1$ to $150_N$ and 160, e.g., to access, receive, retrieve and display media content and other information such as web pages and web sites.

Several elements in the system shown in FIG. 1 include conventional, well-known elements that need not be explained in detail here. For example, client system 120 could include a desktop personal computer, workstation, laptop, PDA, cell phone, or any WAP-enabled device or any other computing device capable of interfacing directly or indirectly to the Internet. Client system 120 typically runs an HTTP client, e.g., a browsing program, such as Microsoft's Internet Explorer™ browser, Netscape Navigator™ browser, Mozilla™ browser, Opera™ browser, or a WAP-enabled browser in the case of a cell phone, PDA or other wireless device, or the like, allowing a user of client system 120 to access, process and view information and pages available to it from server systems $150_1$ to $150_N$ over Internet 140.

Client system 120 also typically includes one or more user interface devices 122, such as a keyboard, a mouse, touch-screen, pen or the like, for interacting with a graphical user interface (GUI) provided by the browser on a display (e.g., monitor screen, LCD display, etc.), in conjunction with pages, forms and other information provided by server systems $150_1$ to $150_N$ or other servers. The present invention is suitable for use with the Internet, which refers to a specific global internetwork of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 120 and all of its components are operator configurable using an application including computer code run using a central processing unit such as an Intel Pentium™ processor, AMD Athlon™ processor, or the like or one or more multiple processors. Computer code such as but not limited to one or more instructions for operating and configuring client system 120 to communicate, process and display data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code for execution, such as a compact disk (CD) medium, a digital versatile disk (DVD) medium, a floppy disk, and the like.

Additionally, the entire program code, or portions thereof, may be transmitted and downloaded from a software source, e.g., from one of server systems $150_1$ to $150_N$ to client system 120 over the Internet as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a client system such as, for example, in C, C+, HTML, XML, Java, JavaScript, any scripting language, such as VBScript. In some embodiments, no code is downloaded to client system 120, and needed code is executed by a server, or code already present at client system 120 is executed.

According to one embodiment, a client application (represented as module 125) executing on client system 120 includes instructions for controlling client system 120 and its components to communicate with server systems $150_1$ through $150_N$ and 160 and to process and display data content received therefrom. Additionally, client application module 125 includes various software modules for processing data and media content. For example, application module 125 can include one or more of a search module 126 for processing search requests and search result data, a user interface module 127 for rendering data and media content in text and data frames and active windows, e.g., browser windows and dialog boxes, and an application interface module 128 for interfacing and communicating with various applications executing on client 120. Further, interface module 127 can include a browser, such as a default browser configured on client system 120 or a different browser.

According to one embodiment, search result server 160 is configured to provide search result data and media content to client system 120, and server systems 150 are configured to provide data and media content such as web pages to client system 120, for example, in response to links selected in search result pages provided by server system 160. Server system 160 in one embodiment references various collection technologies for collecting information from the World Wide Web and for populating one or more indexes with, for example, pages, links to pages, etc. Such collection technologies include automatic web crawlers, spiders, etc., as well as manual or semi-automatic classification algorithms and interfaces for classifying and ranking web pages within a hierarchical structure. In certain aspects, server 160 is also configured with search related algorithms for processing and ranking web pages. Server 160 is also preferably configured to record user query activity in the form of query log files.

Server system 160, in one aspect, is configured to provide data responsive to various search requests received from a client system, in particular search module 126. Server systems 150 and 160 can be part of a single organization, e.g., a distributed server system such as that provided to users by Yahoo! Inc., or they can be part of disparate organizations. Server systems 150 and server system 160 each includes at least one server and an associated database system, and may include multiple servers and associated database systems, and although shown as a single block, may be geographically distributed. For example, all servers of server system 160 can be located in close proximity to one another (e.g., in a server farm located in a single building or campus), or they may be distributed at locations remote from one another (e.g., one or more servers located in city A and one or more servers located in city B). As used herein, the term "server system" will typically include one or more logically and/or physically connected servers distributed locally or across one or more geographic locations. Additionally, the term "server" typically includes a computer system and an associated storage system and database application as is well known in the art. The terms "server" and "server system" will be used interchangeably herein.

According to one embodiment, server 160 includes algorithms that provide search results to users in response to search queries received from client system 120. According to an embodiment of the present invention, server system 160 is configured to increase coverage of search queries received from client system 120 without a corresponding decrease in relevance.

Figure 2A:
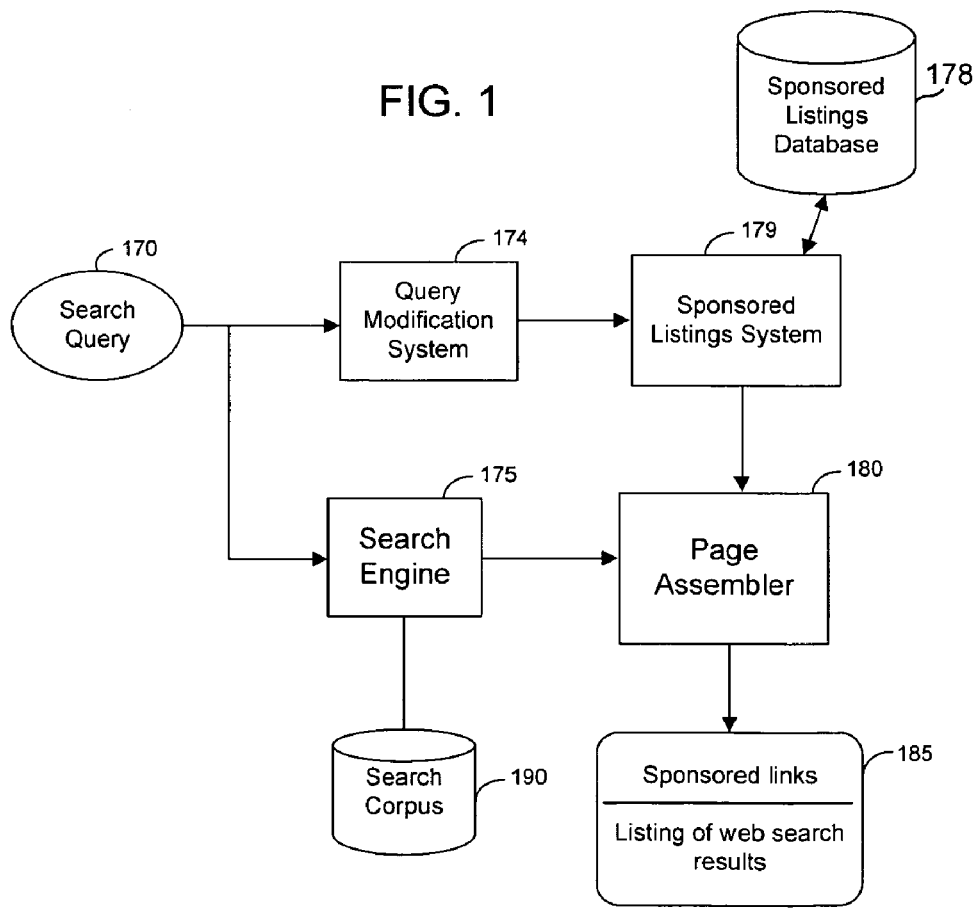
FIG. 2A is a generalized diagram illustrating how a query modification system interacts with a web search system according to an embodiment of the present invention.

FIG. 2A illustrates is a generalized diagram illustrating how a query modification system 174 interacts with a web search system according to an embodiment of the present invention. A search query 170 is transmitted to a search engine 175 to initiate a search of the Internet. Search engine 175 can implement any Internet or web searching methods such as a crawling indexer.

Search engine 175 locates web content matching search query 170 from a search corpus 190. Search corpus 190 can store copies of content that is accessible via the World Wide Web, the Internet, intranets, local networks, and wide area networks.

Search engine 175 retrieves content from search corpus 190 matching search query 170 and transmits the matching content (i.e., search results) to a page assembler 180. Page assembler 180 displays the search results in a readable format. The search results are displayed to a user as a listing of web search results in search result display screen 185.

Search queries that are transmitted to search engine 175 are also sent to sponsored listings system 179 through query modification system 174. Sponsored listings system 179 selects sponsored web links to display in response to receiving a search query. The sponsored web links from a sponsored listing database 178 are sent to page assembler 180 and displayed in a portion of search result display screen 185.

With sponsored listing system 179, sponsors' web sites can be displayed in a sponsor section of screen 185 when a search query matches a predefined search query string. For example, the computer hardware vendor might want to promote its printers by having a web page about printers from that vendor's website be pointed to by a sponsored link that would appear in the sponsored links region of display screen 185 when a web user enters the term "printers" has a search query. The hardware vendor would pay the search system operator for each time a user clicks on the printers sponsored link as that link is displayed in the sponsored links portion of display screen 185.

Sponsored listings database 178 might contain records mapping search query strings to sponsors and sponsor's presentations, wherein a presentation might be a short text sequence and a web link. The mappings might be determined by a bidding process or other process used to assign search query strings to sponsors. Using that database 178, when sponsored listings system 179 receives a search query, modified or otherwise, sponsored listings system 179 determines whether the search query matches one of the predefined search query strings that are in the database.

Typically, if the search query exactly matches one of the indexed search query strings, sponsored listings system 179 retrieves the sponsored web links that are indexed with that search query string. The selected sponsored web links are transmitted to page assembler 180. If the search query does not exactly match one of the indexed search query strings, sponsored listings system 179 does not return any sponsored web links. Thus, failing to locate an exact match between a search query entered by a user and one of the indexed search query strings prevents the search provider from receiving revenue from a sponsor.

The query modification system attempts to mitigate this problem by modifying search queries that are transmitted to sponsored listings system 179 when the search queries do not have a match. As discussed above, sponsors pre-select one or more search query strings. The search query strings that a sponsor selects are indexed with that sponsor's web link and when a user submits a search query, if there are no matches, sponsored listings system 179 would otherwise not return any sponsor web links or presentations. Query modification system 174 generates modified search queries from the search queries where the modified search queries are more likely to match one or more of the indexed search query strings pre-selected by the sponsors, thus increasing coverage, but do so in a way that there is not a corresponding decrease in relevance. Further details of how query modification system 174 might modify queries are described below with respect to FIGS. 4A-4C.

Figure 2B:
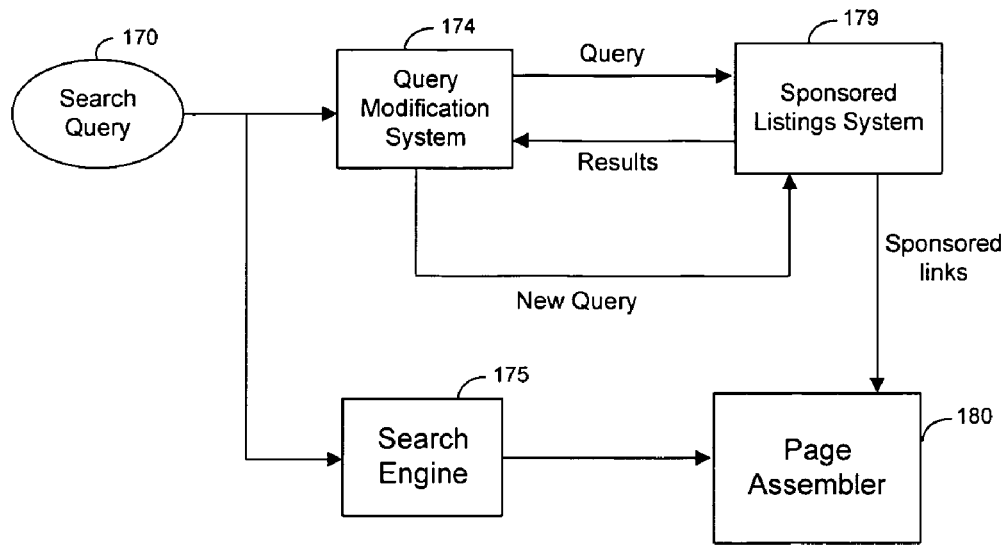
FIG. 2B is a diagram illustrating a specific example of how a query modification system modifies queries after they are transmitted to a sponsored listings system according to an embodiment of the present invention.

FIG. 2B illustrates one particular system for modifying search queries so that they are more likely to match one of the sponsor-selected search query strings. In the embodiment of FIG. 2B, search query modification system 174 initially forwards all search queries 170 directly to sponsored listings system 179 without modifying them. System 174 also stores copies of the search queries it sends to system 179.

Sponsored listings system 179 then attempts to match the search query with one of the indexed search query strings as discussed above and returns the corresponding sponsored web links to query modification system 174. If sponsored listings system 179 returns at least a predetermined number of sponsored web links, these links are sent directly to page assembler 180.

If sponsored listings system 179 returns less than the predetermined number of sponsored web links (e.g., less than 1 or less than 2), query modification system 174 then changes search query 170 into a new query to increase the chance that the new query will match more of the pre-selected sponsored query strings.

The new query is transmitted from system 174 back to sponsored listings system 179. System 179 then attempts to match the new query against the sponsored search query strings. If a new set of sponsored links are identified as matching the new query, the new set of sponsored links are transmitted to page assembler 180.

Figure 2C:
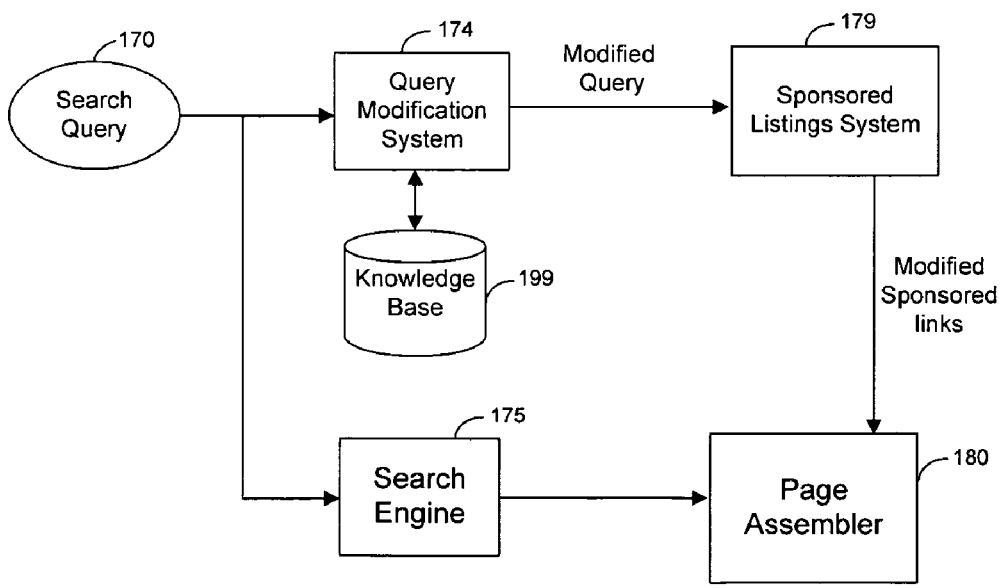
FIG. 2C illustrates another specific example of how a query modification system modifies queries before they are transmitted to a sponsored listings system according to an embodiment of the present invention.

FIG. 2C illustrates another system for modifying search queries so that they are more likely to match more of the sponsor-selected search query strings. In the embodiment of FIG. 2C, query modification system 174 modifies all search queries 170 that it receives before the queries are transmitted to sponsored listings system 179, using a knowledge base 199. Knowledge base 199 stores sets of rules that are used to increase the coverage of search queries with respect to the sponsored links. After a query has been modified, the modified query is transmitted to sponsored listings system 179. System 179 locates sponsored links that match the modified query and transmits the results to page assembler 180. In some embodiments, the original query and the modified query are provided to sponsored listings system 179.

As illustrated in various figures, queries are modified by the query modification system while the original query is submitted to a search engine. In some embodiments, the query modification occurs at the client side, in others it occurs at the location of the search engine and in yet others, it occurs at a different place in a network. Where full access to the sponsored listings system is not available to the search system operator, the search system operator can provide the query modification system external to the sponsored listings system and treat the sponsored listing system as a "black box" with no internal modifications.

Additional components might be added to a basic system. For example, one enhancement provides feedback by noting the click-throughs that occur for particular search queries and use that information in deciding how to modify search query terms. In some cases, the click-through rates are an indication of relevance and those indications can be used to select from among several options for modified queries.

Figure 3:
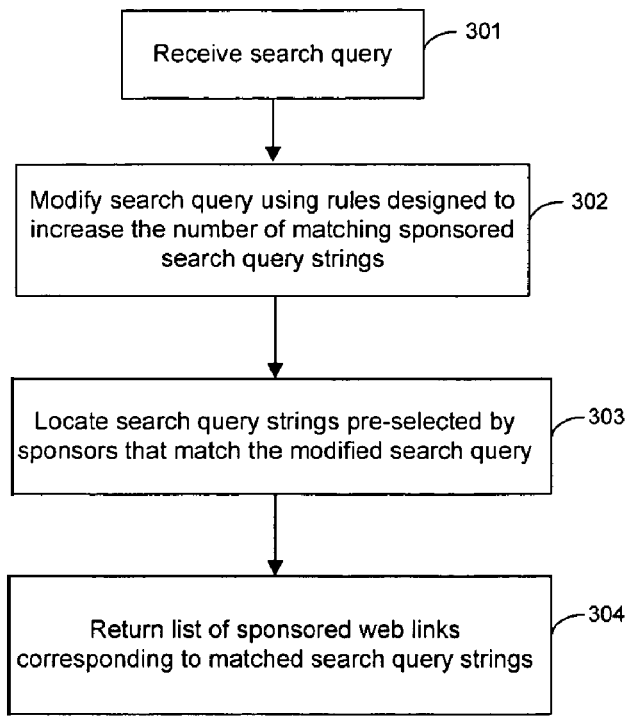
FIG. 3 is a flowchart that illustrates a general methodology for modifying search queries to increase the number of matching sponsored listings according to the present invention.
Figure 4A:
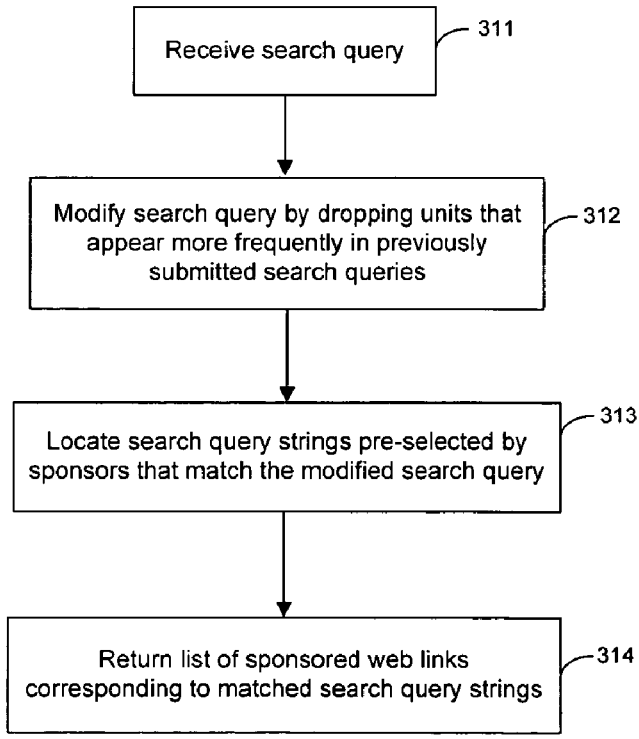
FIG. 4A illustrates a method of increasing the number of matching sponsored listings by identifying more specific units in the search query.
Figure 4B:
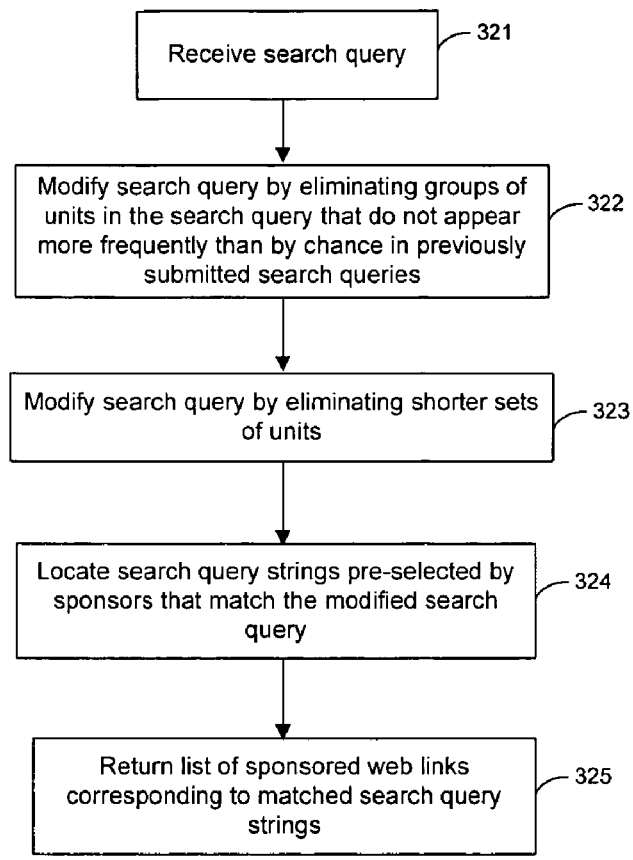
FIG. 4B illustrates a method of identifying longer sets of units in the search query.
Figure 4C:
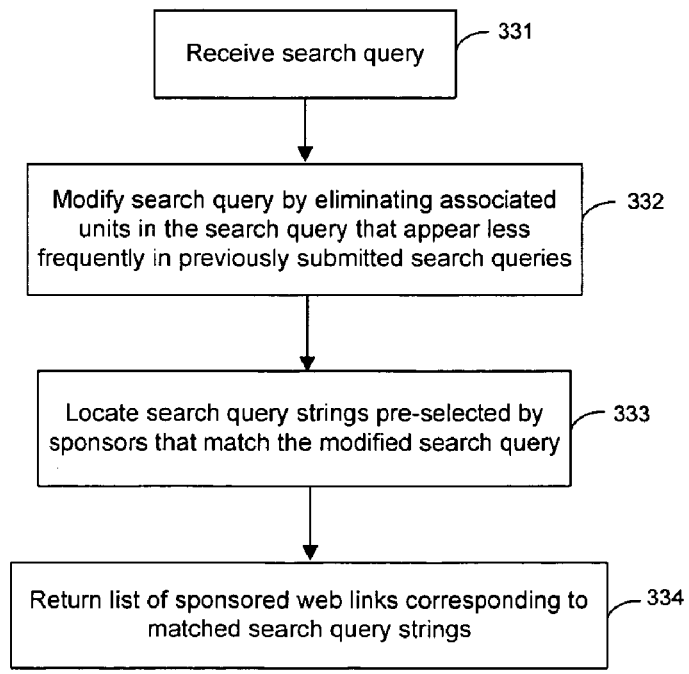
FIG. 4C illustrates a method of identifying frequently occurring unit associations in the search query.
Figure 5A:
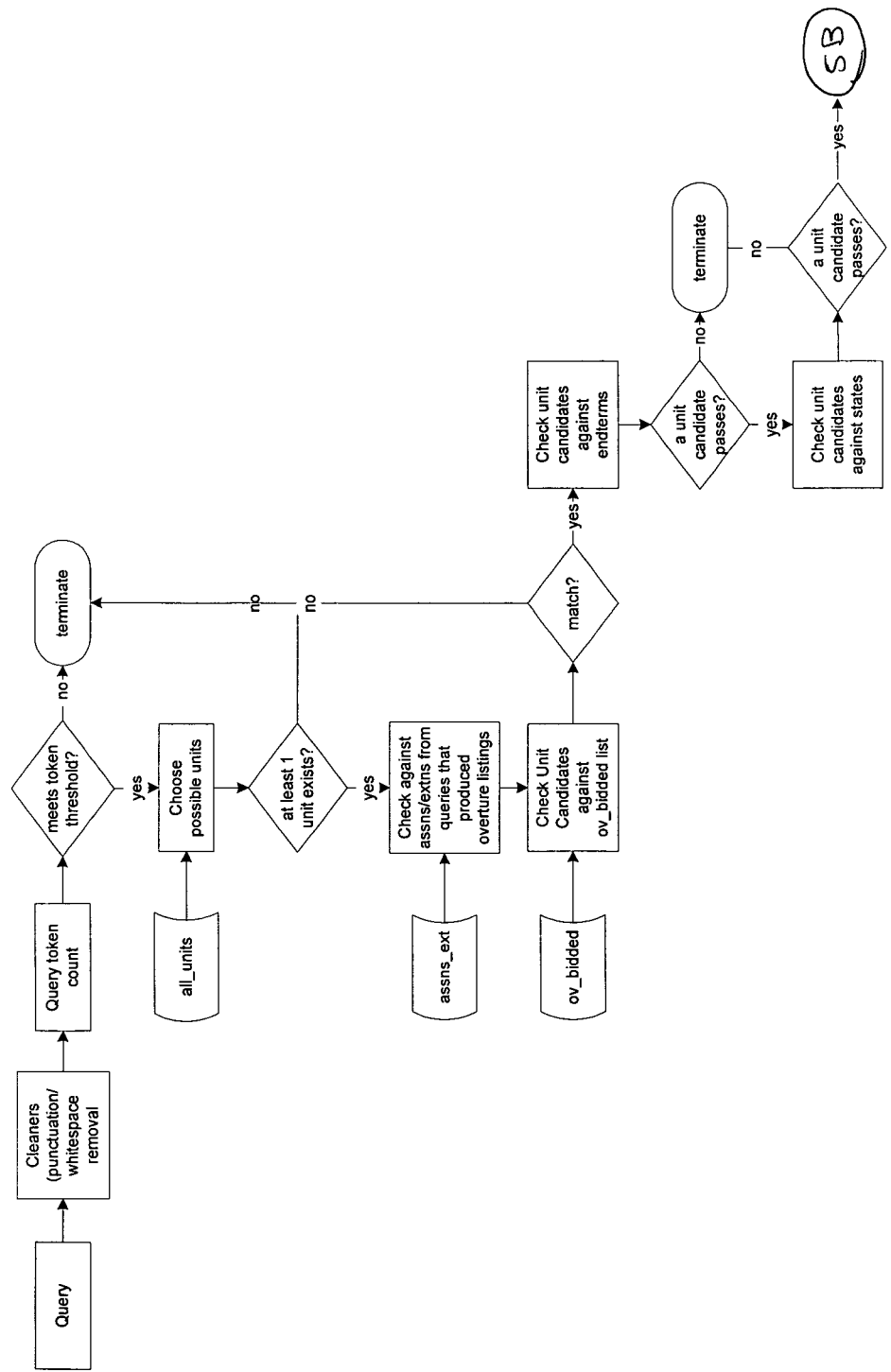
FIGS. 5A and 5B together form FIG. 5.
Figure 5B:
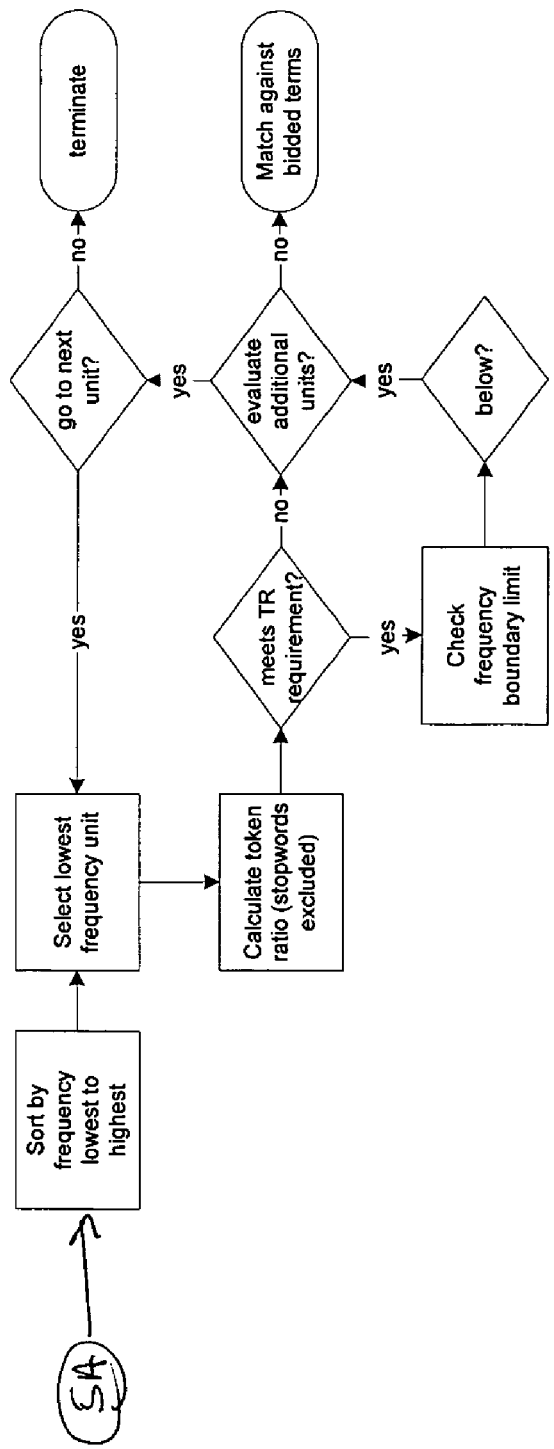
Figure 6A:
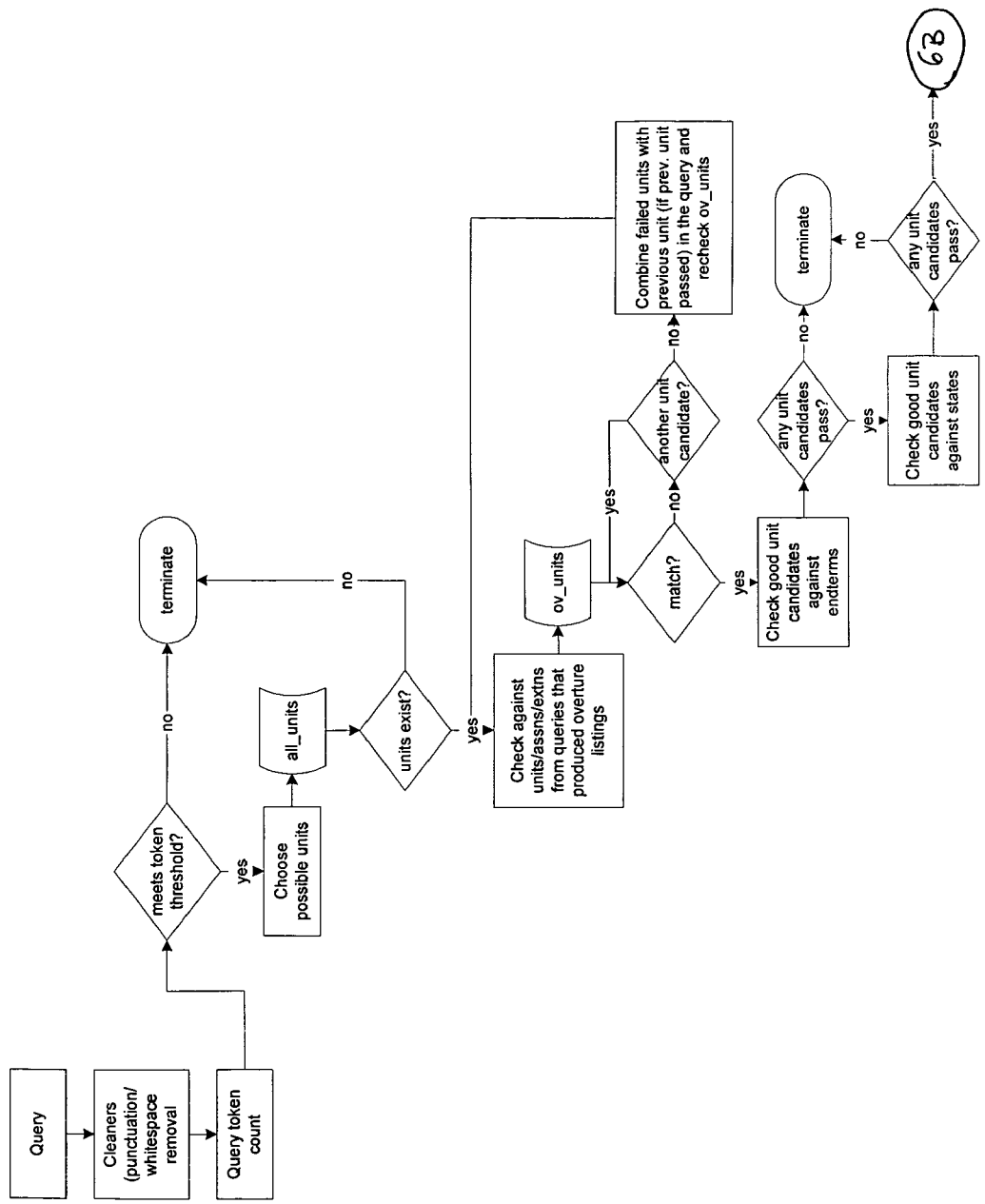
FIGS. 6A and 6B together form FIG. 6.
Figure 6B:
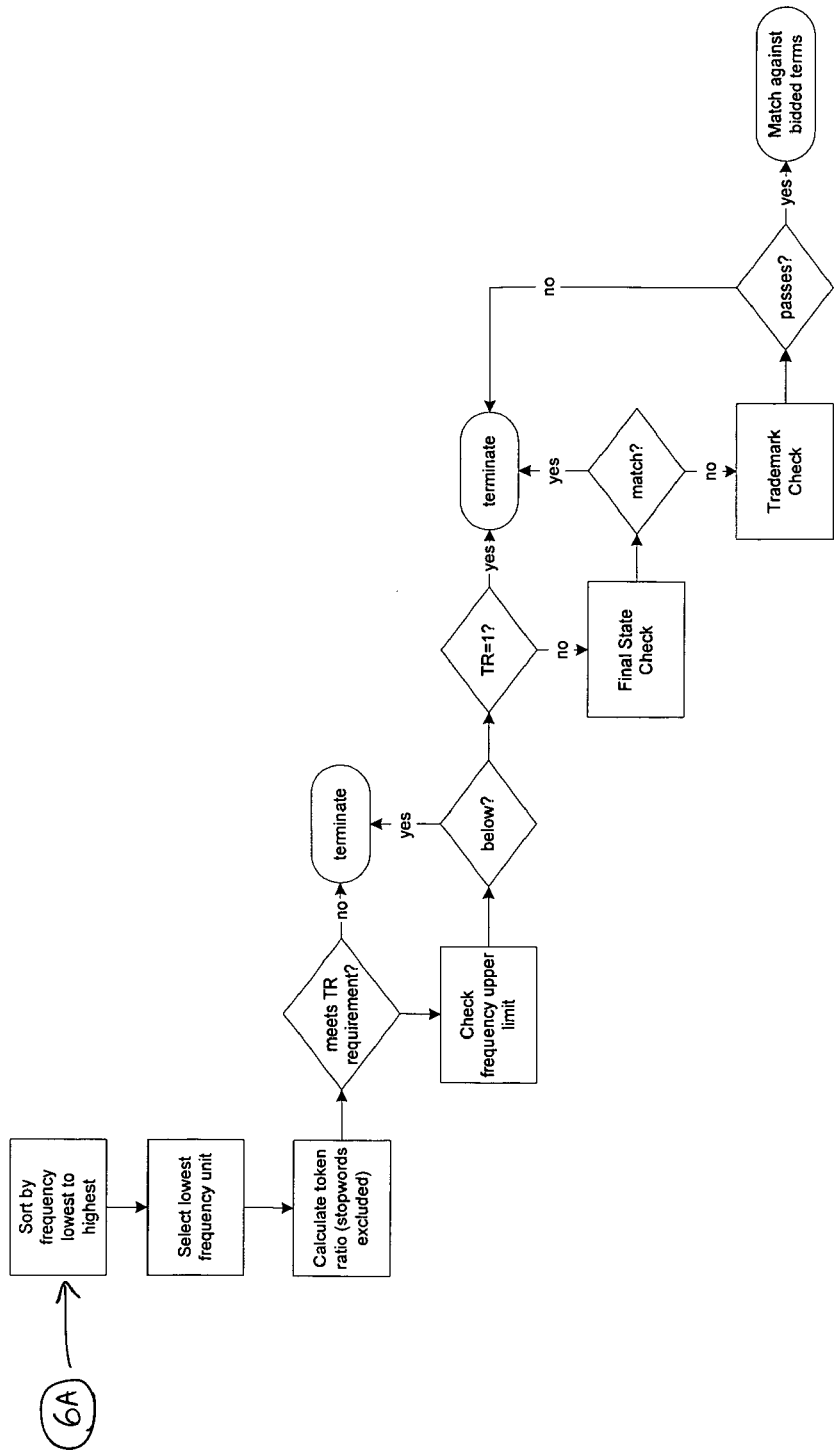

Various embodiments of methods for modifying queries to increase coverage without a corresponding loss of relevance are now described in detail with respect to FIGS. 4A-4C. FIG. 3 is a flowchart that illustrates a general methodology for modifying search queries to increase coverage.

Referring to FIG. 3, query modification system 174 receives a search query from a user at step 301. At step 302, query modification system 174 modifies the search query using rules designed to increase the number of sponsored search query strings that the search query received at step 301 matches, without corresponding loss of relevance. Many embodiments of these rules are possible. Examples of rules that can increase the number of matching sponsored search query strings are described below with respect to FIGS. 4A-4C.

Each sponsored search query string is indexed with one or more sponsored links in sponsored listing system 179. Query modification system 174 can modify search queries before or after they have been sent to system 179, as discussed above with respect to FIGS. 2A-2B.

At step 303, system 179 attempts to locate sponsored search query strings that match the modified search query. If sponsored search query strings are matched at step 303, system 179 returns the sponsored links that correspond to the matched query strings at step 304.

According to a more specific embodiment of the present invention illustrated in FIG. 4A, the number of matching sponsored listings can be increased by identifying units in a search query that appeared less frequently in previous search queries.

Search queries can be decomposed into constituent parts referred to as units. A query processing engine can decompose a search query into one or more constituent units using statistical methods. A unit is one or more word sequence that typically corresponds to a natural concept such as "New York City" or "bird of prey." Further details of techniques for generating concept units from search queries are discussed in co-pending and commonly-assigned U.S. patent application Ser. No. 10/713,576, filed Nov. 12, 2003, which is incorporated by reference herein.

According to the embodiment of FIG. 4A, each of the units in a search query is compared to previously submitted search queries. In some cases, previously submitted search queries are stored for later use.

Weight values are assigned to units in the search query based on the relative frequency that the units appeared in previously submitted search queries. Units that appeared less frequently in previous searches are given a higher weight, and units that appeared more frequently in previous search queries are given a lower weight.

Units that have appeared less frequently in past search queries correspond to more specific concepts. The less frequently occurring units are more likely to be a good approximation of the user's true intent in entering the search query. The units that appeared more frequently in previous search queries are more generic and less likely to be a good approximation of the user's intent.

Query modification system 174 drops units in a search query that have lower weights. Thus, the original search query is modified to contain only the units in the original query that appeared less frequently in previous search queries relative to the other units in the original query. This feature allows more frequently occurring units in a search query to be filtered out to increase the coverage of sponsored listings.

Because some of the units in the original query are eliminated, the modified search query has fewer units. Queries shortened in this way have an increased chance of matching a larger number of sponsored listings in system 179. In general, when sponsored listings system 179 processes the modified search query, it is likely to return more sponsored links than when it processes the original query. Thus, this embodiment generally increases the coverage of sponsored links that are returned by system 179 without a corresponding decrease in relevance.

For example, a user can enter a search query for a "10 day trip to Europe" to locate travel information to help plan a European vacation. This search query includes two concepts, "10 day" and "trip to Europe." However, the concept "trip to Europe" is more relevant to the user's intent (planning a European vacation) than the concept "10 day." Many travel web sites relating to European vacations do not include the phrase "10 day." Sponsored listings system 179 may not return sponsored links to European travel web sites that do not mention "10 day."

According to an embodiment of the present invention, the units "10 day" and "trip to Europe" are compared to previous search queries to determine how frequently these units appeared. Because "10 day" appears more frequently than "trip to Europe," the unit "10 day" is dropped from the search query. The modified search query only contains "trip to Europe." The modified query "trip to Europe" has a greater chance of exactly matching more sponsored search query strings than "10 day trip to Europe."

FIG. 4A illustrates a methodology according to this embodiment of the present invention. At step 311 query modification system 174 receives a search query. At step 312, system 174 modifies the query by dropping the units that appear more frequently in previously submitted queries. The modified search query only contains the units that appeared less frequently in previous queries relative to other units in the original search query.

At step 313, sponsored listings system 179 attempts to locate sponsored search query strings that match the modified search query. At step 314, system 179 returns a list of sponsored web links corresponding to the matched search query strings.

According to another embodiment, the units in a search query are compared with previously submitted search queries to determine how often groups of units in the search query appear in the previous search queries. Thus, a log of queries can be used to determine how frequently units occur, how frequently they occur in various combinations, etc. and that information can be used to determine how best to modify the search query to improve coverage without a corresponding decrease in relevance.

For example, query modification system 174 might modify a search query by eliminating units or groups of units that appeared less frequently. System 174 might also drop shorter groups of units from the search query.

To illustrate this with an example, consider the search query "Seattle cheap hotel." For purposes of this example, suppose that each of the three words in the query were found to be separate units. Query modification system 174 might use query logs to determine the frequency of each combination of units in the query in previous queries and find that "cheap hotel" and "Seattle cheap hotel" appear more frequently than "Seattle cheap". In that case, query modification system 174 would not modify the query because longest string is also one of the most frequent. However, if the "Seattle hotel" appears much more frequently that "Seattle cheap hotel", query modification system 174 might modify the query to be "Seattle hotel".

FIG. 4B illustrates another methodology. At step 321, query modification system 174 receives a search query. At step 322, system 174 modifies the query by eliminating groups of units in the search query that do not appear more frequently than by chance in previously submitted search queries. These groups of units are less likely to match relevant sponsored listings.

At step 323, query modification system 174 modifies the search query again by eliminating shorter sets of the remaining units. The longer units are also more likely to match relevant sponsored listings.

At step 324, query modification system 174 locates sponsored search query strings that match the modified search query. Because, in general, groups of units are eliminated from the search query, the modified search query is less specific, and therefore has an increased chance of matching more sponsored search query strings. Eliminating groups of units from queries is another way that the present invention increases the coverage of search queries with respect to sponsored listings. At step 325, sponsored listings system 174 returns a list of sponsored web links that correspond to the matched search query strings.

Associated units in a current search query might be compared with previously submitted search queries to determine if the associated units occur together more or less frequency in past search queries.

Associated units are groups of units that are not sufficiently related to form a new unit. Associated units that appear together more frequently in previous search queries are probably more likely to match relevant sponsored links than less frequently occurring associated units. Thus, a search query can be modified by eliminating the unit associations that appeared less frequently in past queries.

To illustrate an example of this, consider the search query "first trimester pregnancy nausea." The query contains two unit associations which are "first trimester" and "pregnancy nausea." In this example, the words in both of these associations are not sufficiently related to be new two-word units.

Query modification system 174 determines how frequently each of these unit associations appeared in the previously submitted search queries. If the unit association "pregnancy nausea" appeared more frequently in previous search queries than "first trimester" then the search query might be modified by eliminating the unit association "first trimester." The modified search query would then be "pregnancy nausea." In this manner, a modified search query, "pregnancy nausea" is submitted that have more coverage (as it is more likely that a sponsor would sponsor the search query "pregnancy nausea" than the search query "first trimester pregnancy nausea". Notably, the relevance does not decline much for the original search query and the modified search query, as might occur if the modified search query were "first" (which might have wide coverage, but low relevancy), or "first trimester" (which might have low relevancy as the search is mostly about nausea during pregnancy).

FIG. 4C illustrates another methodology. At step 331, query modification system 174 receives a search query. At step 332, system 174 modifies the query by eliminating associated units in the query that appeared less frequently in previous queries than other associated units in the current query. The less frequently occurring associated units are less likely to match relevant sponsored listings.

At step 333, query modification system 174 locates sponsored search query strings that match the modified search query. Because associated units have been removed from the search query at step 332, the modified search query is less specific and therefore likely to match more sponsored search query strings. Eliminating associated units from queries is another way that the present invention increases the coverage of search queries with respect to sponsored listings. At step 334, sponsored listings system 174 returns a list of sponsored web links that correspond to the matched search query strings.

By modifying a search query to include less units, groups of units, or associated units, the present invention increases the coverage of matching sponsored links. Units, group of units, and associated units are dropped from the search query. By dropping less relevant units, the present invention increases the coverage of sponsored links that are returned in response to a query. In general, the units, groups of units, and unit associations that are dropped from the search query are identified as being less likely to be a good approximation of a user's intent based on predefined sets of rules.

In addition to modifying queries to improve coverage without a corresponding reduction in relevance, query modification system 174 might also provide filtering functions. For example, it might modify queries to provide adult filtering, brand name filtering, etc. With such filtering, some terms that might have been eliminated are left in. For example, if someone searched for "brand X shoes", the relevant portion of the string would be "shoes", but if the "brand X" portion were left off, it would too greatly modify the results, so it should be left in. More generally, selector words are identified and left in the query even if other measures would have shortened a query by removing those words.

According to another embodiment of the present invention, a query is modified by substituting the query with a synonym or a preferred form of a query. The synonyms and preferred forms correspond to predefined query strings that have been selected by sponsors to correspond to sponsored links. This embodiment of the present invention allows a modified query to match a sponsor listing, even if the original query does not exactly match a predefined query string linked to the sponsored listing.

For example, the query "NYC restaurants" can be replaced with the modified query "New York City restaurants," if "New York City restaurants" is a predefined query string that has been selected by a sponsor, but "NYC restaurants" has not been selected by a sponsor. As another example, the query "autos repair" can be modified into the query "car repair," by appropriately modifying the original query to generate a synonym or a preferred form. As yet another example, the phrase "wood work" can be a preferred form of "woodwork."

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiments disclosed, but that the invention will include all embodiments and equivalents falling within the scope of the claims.

What is claimed is:

1. A computer-implemented method for modifying a search query before presenting the search query to a matching system, comprising:

storing, in a database, a plurality of sponsored links, wherein each sponsored link of the plurality of sponsored links comprises at least one of: a link to a presentation, a link to an advertisement, and a web link;

receiving, from sponsors, selection information that explicitly identifies which of a plurality of predefined query strings are to be associated with said each sponsored link of the sponsored links;

based on the selection information, storing data that indicates a correspondence between said plurality of predefined query strings and said plurality of sponsored links;

after (i) storing the plurality of sponsored links, (ii) receiving the selection information, and (iii) storing the data, receiving a query to initiate a performance of a search, wherein the query identifies a set of units, and wherein each unit, of said set of units, corresponds to one or more search terms directed towards a single concept;

modifying the query, to produce a modified query, using rules designed to increase a chance that the modified query matches one or more predefined query strings;

identifying at least one of the predefined query strings that matches the modified query;

returning at least one of the sponsored links to which said at least one predefined query string corresponds;

wherein the step of the modifying the query, to produce the modified query, further comprises performing at least one of:

a) determining how frequently each unit identified by the query appears in previously submitted queries, and modifying the query by eliminating the units in the query that appear more frequently in the previously submitted queries relative to other units in the query, b) determining how frequently each unit identified by the query appears in the previously submitted queries, and modifying the query by eliminating the units in the query that appear less frequently in the previously submitted queries relative to other units in the query, and c) determining how frequently each unit identified by the query appears in the previously submitted queries, and modifying the query by eliminating groups of units in the query that appear less frequently in the previously submitted queries, relative to other units in the query, to produce a preliminary modified query;

wherein the step of the modifying the query is performed by one or more computing devices.

2. The method according to claim 1, wherein modifying the query, to produce a modified query, further comprises:
determining how frequently each unit identified by the query appears in the previously submitted queries; and
modifying the query by eliminating the units in the query that appear more frequently in the previously submitted queries relative to other units in the query.

3. The method according to claim 1, wherein modifying the query, to produce a modified query, further comprises:
determining how frequently each unit identified by the query appears in the previously submitted queries; and
modifying the query by eliminating the units in the query that appear less frequently in the previously submitted queries relative to other units in the query.

4. The method according to claim 1, wherein modifying the query, to produce a modified query, further comprises:
determining how frequently each unit identified by the query appears in the previously submitted queries; and
modifying the query by eliminating the groups of units in the query that appear less frequently in the previously submitted queries, relative to other units in the query, to produce a preliminary modified query.

5. The method according to claim 1 wherein modifying the query, to produce a modified query, further comprises:
eliminating a unit identified by the query that corresponds to fewer search terms relative to other units in the query.

6. The method according to claim 1, further comprising:
before the query is modified to produce the modified query, attempting to identify which of the predefined query strings match the query; and
returning a result that includes a subset of the sponsored links, wherein the modified query is generated in response to determining that the result includes less sponsored links than a predetermined number.

7. The method according to claim 1, wherein modifying the query to produce the modified query using the rules further comprises:
determining how frequently units, groups of units, or associated units in the query appear in previously submitted queries.

8. The method according to claim 1, wherein the query is modified to produce the modified query before an attempt is made to match the query to the predefined query strings.

9. The method according to claim 1, further comprising:
performing the search based on the query using a search engine to generate search results; and
displaying said at least one of the sponsored links on a display screen along with the search results.

10. The method according to claim 9, further comprising:
dividing the display screen into a sponsor section and a search-result section; and
displaying said at least one of the sponsored links within the sponsor section and displaying the search results in the search-result section.

11. The method according to claim 1, wherein modifying the query to produce the modified query further comprises:
substituting the query with a synonym or a preferred form that corresponds to one of the predefined query strings.

12. The computer system defined in claim 1, wherein modifying the query, to produce a modified query, further comprises:
eliminating a unit identified by the query that corresponds to fewer search terms relative to other units in the query.

13. The method of claim 1, further comprising:
wherein modifying the query includes eliminating at least one unit from the query.

14. The method of claim 1, further comprising:
wherein the search is performed on a corpus, and wherein the database is separate from the corpus.

15. A computer system designed to modifying a search query before presenting the search query to a matching system, the computer system comprising:
one or more processors; and
volatile or non-volatile memory storing one or more instructions, wherein execution of the one or more instructions by the one or more processors causes:
storing, in a database, a plurality of sponsored links, wherein each sponsored link of the plurality of sponsored links comprise at least one of: a link to a presentation, a link to an advertisement, and a web link;
receiving, from sponsors, selection information that explicitly identifies which of a plurality of predefined query strings are to be associated with each sponsored link of the sponsored links;
based on the selection information, storing data that indicates a correspondence between said plurality of predefined query strings and said plurality of sponsored links;
after (i) storing the plurality of sponsored links, (ii) receiving the selection information, and (iii) storing the data, receiving the query to initiate a performance of a search, wherein the query identifies a set of units, and
wherein each unit, of said set of units, corresponds to one or more search terms directed towards a single concept; and
modifying the query, to produce a modified query, using rules designed to increase a chance that the modified query matches one or more predefined query strings, identifying at least one of the predefined query strings that matches the modified query, wherein the step of modifying the query, to produce a modified query, further comprises performing at least one of:
a) determining how frequently each unit identified by the query appears in previously submitted queries, and modifying the query by eliminating the units in the query that appear more frequently in the previously submitted queries relative to other units in the query,
b) determining how frequently each unit identified by the query appears in the previously submitted queries, and modifying the query by eliminating the units in the query that appear less frequently in the previously submitted queries relative to other units in the query, and
c) determining how frequently each unit identified by the query appears in the previously submitted queries, and modifying the query by eliminating groups of units in the query that appear less frequently in the previously submitted queries, relative to other units in the query, to produce a preliminary modified query.

16. The computer system defined in claim 15, wherein execution of the one or more instructions by the one or more processors further causes:
returning at least one of the sponsored links that corresponds to said at least one predefined query string.

17. The computer system defined in claim 16, wherein execution of the one or more instructions by the one or more processors further causes:
performing the search based on the query using a search engine to generate search results; and
displaying said at least one of the sponsored links on a display screen along with the search results.

18. The computer system defined in claim 15, wherein the modifying the query, to produce a modified query, further comprises:
determining how frequently units each unit identified by the query appears in the previously submitted queries; and
modifying the query by eliminating the units in the query that appear more frequently in the previously submitted queries relative to other units in the query.

19. The computer system defined in claim 15, wherein the modifying the query, to produce a modified query, further comprises:
determining how frequently units each unit identified by the query appears in the previously submitted queries; and
modifying the query by eliminating the associated units in the query that appear less frequently in the previously submitted queries relative to other units in the query.

20. The computer system defined in claim 15, wherein the modifying the query, to produce a modified query, further comprises:
determining how frequently each unit identified by the query appears in the previously submitted queries; and
modifying the query by eliminating the groups of units in the query that appear less frequently in the previously submitted queries, relative to other units in the query, to produce a preliminary modified query.

21. The computer system defined in claim 15, wherein execution of the one or more instructions by the one or more processors further causes:
before the query is modified to produce the modified query, attempting to identify which of the predefined query strings match the query; and
returning a result that includes sponsored links, wherein the modified query is generated in response to determining that the result includes less sponsored links than a predetermined number.

22. The computer system defined in claim 15, wherein the query is modified to produce the modified query before an attempt is made to match the query to the predefined query strings.

23. The computer system defined in claim 15, wherein modifying the query to produce the modified query further comprises:
determining how frequently units, groups of units, or associated units in the query appear in previously submitted queries.

24. The computer system defined in claim 15, wherein modifying the query to produce the modified query further comprises:
substituting the query with a synonym or a preferred form that corresponds to one of the predefined query strings.

25. The method of claim 15, further comprising:
wherein modifying the query includes eliminating at least one unit from the query.

* * * * *